Sept. 3, 1968  R. R. KNUTH  3,399,776

DETACHABLE SNAP-ON FILTER FOR A HYDRAULIC SYSTEM

Filed Sept. 2, 1965  3 Sheets-Sheet 1

INVENTOR
ROBERT R. KNUTH

BY Chester W. Brown

ATTORNEY

INVENTOR
ROBERT R. KNUTH

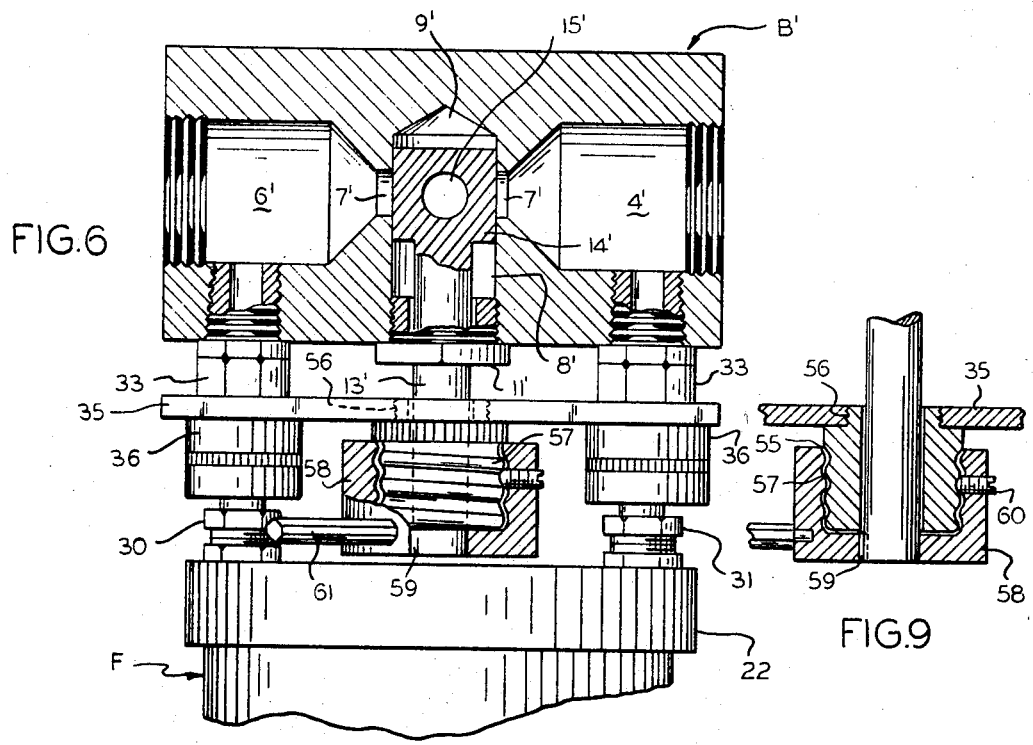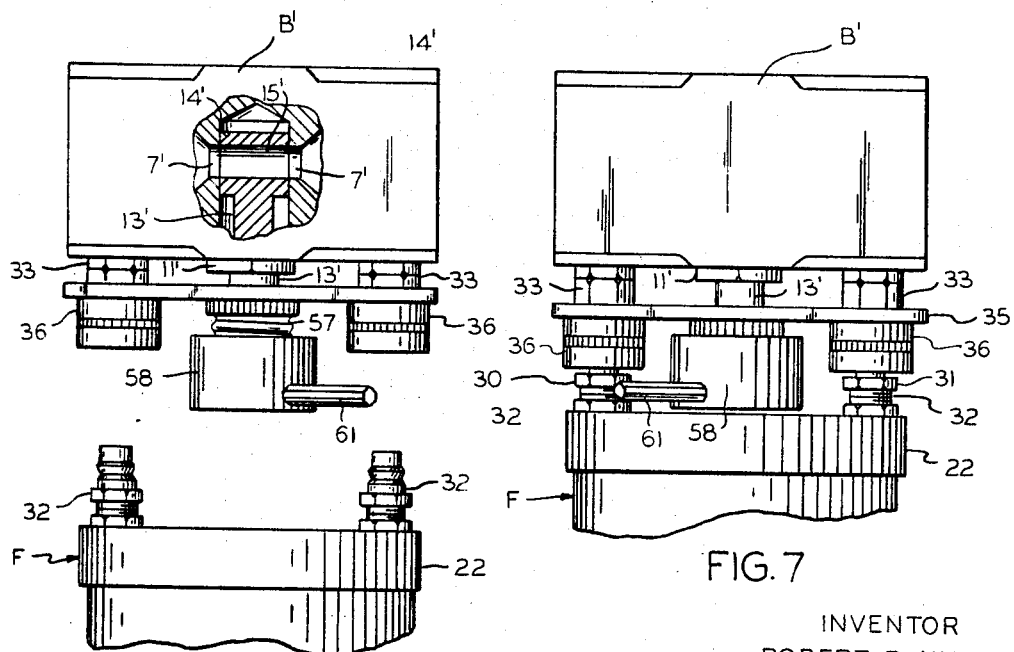

United States Patent Office 3,399,776
Patented Sept. 3, 1968

3,399,776
DETACHABLE SNAP-ON FILTER FOR A HYDRAULIC SYSTEM
Robert R. Knuth, Milwaukee, Wis.
(807 E. Harding Drive, Appleton, Wis. 54911)
Filed Sept. 2, 1965, Ser. No. 484,554
1 Claim. (Cl. 210—234)

ABSTRACT OF THE DISCLOSURE

A filter and valve arrangement which utilizes a pair of valved couplers and nipples. The nipples are fixed to the filter housing and form the inlet and outlet connections. The couplers are secured to the valve body and are adapted to be detachably secured to the nipples. The valve body includes a valve passage which, when the filter is removed, bypasses the couplers.

Summary of the invention

An object is to provide a filter unit which may be easily removed from the system and which when so removed, automatically closes the bypass circuit and simultaneously opens the system for direct flow of liquid in the system.

Another object is to provide a filter unit which may be easily and quickly removed from a hydraulic system for removal and replacement of filtered material without necessitating interruption of the flow of fluid in the system and insuring a minimum loss of fluid when the filter unit is removed.

The foregoing and other objects will become apparent as the following description of the drawings progresses.

Specific description of the drawings

In the drawings:

FIG. 6 is an enlarged longitudinal sectional view similar to FIG. 5 illustrating a modified form of my invention.

FIG. 7 is a side view in reduced size, looking from the same position relative to FIG. 6.

FIG. 8 is a view similar to FIG. 7, partly in section, showing the main elements separated.

Figure 1:
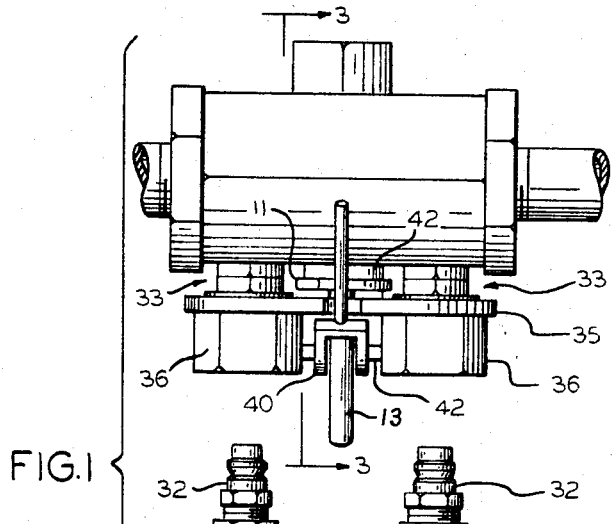
FIG. 1 illustrates a fragmentary portion of a hydraulic system and a filter unit separated therefrom.

The fragmentary portion of the hydraulic system shown in the drawings comprises a valve body B connected at one end with a pipe 1 and at the opposite end with a pipe 2, each pipe comprising a portion of liquid circulating system. The pipe 1 threadedly engages a coupling bushing 3 which is threaded into the chamber 4 at said one end. The pipe 2 threadedly engages the coupling 5 which is threaded into the chamber 6.

The chambers 4 and 6 are connected by a venturi-like opening 7 intersected by a traverse bore 8 closed at one end by a bushing 9 having a recess 10 of a diameter substantially the same as the bore 8. The opposite end of the bore 8 is closed by a bushing 11 having a bearing bore 12 concentric with the axis of the bore 8 and serving as a bearing for the rod 13 which is slideable therein and projects downwardly from the piston valve 14 reciprocable in the bore 8. The piston valve 14 is connected to and spaced from a valve portion 14A by means of a rod 15 to provide an area serving as a portion of the venturi-like opening 7 when the piston valve 14 is moved downwardly by means of the coil spring disposed in the bore 10 in the bushing 9 and between the valve portion 14A and bushing 9. Rings 16 on the piston valve 14 and valve portion 14A serve to prevent leakage of fluid.

The filter unit F comprises a filter body or container 20 closed at the bottom by means of a base member 21 and at the top by means of cap 22 having an inlet 23 and a centrally located outlet 24 communicating with outlet conduit 26 closed at its outer end by a plug 27 and communicating with outlet port 24. A filter cartridge 28 is removably placed in the filter body 20 and is retained substantially centrally of the container 20 by means of the downwardly projecting hub 24A surrounding the outlet 24.

The filter container 20 is releasably connected to the valve body B by means of a pair of valved couplers 30 and 31 (FIGS. 2 and 5), each comprising a valved nipple 32 connected to the filter container 20 (FIG. 1) and a combination valved coupler 33 (FIG. 1). The valved coupler and nipple is well known in the art and may be of the type illustrated in catalog 60B issued by Snap-Tite, Inc., Union City, Pa.

Figure 2:
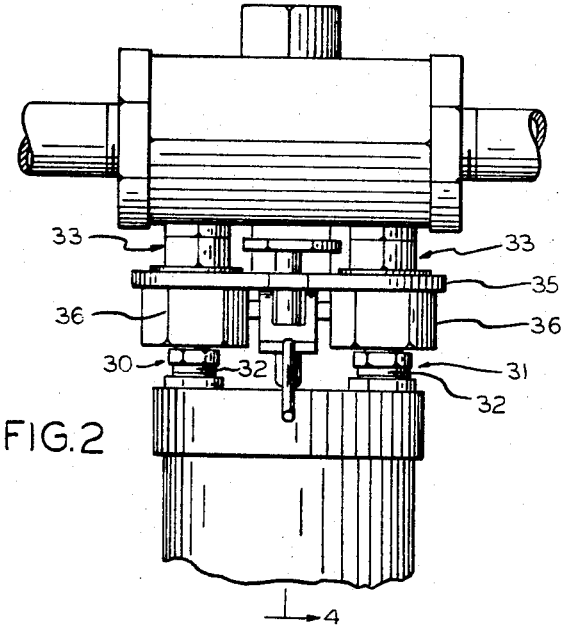
FIG. 2 shows the filter unit plugged into the fragmentary portion of the system.
Figure 5:
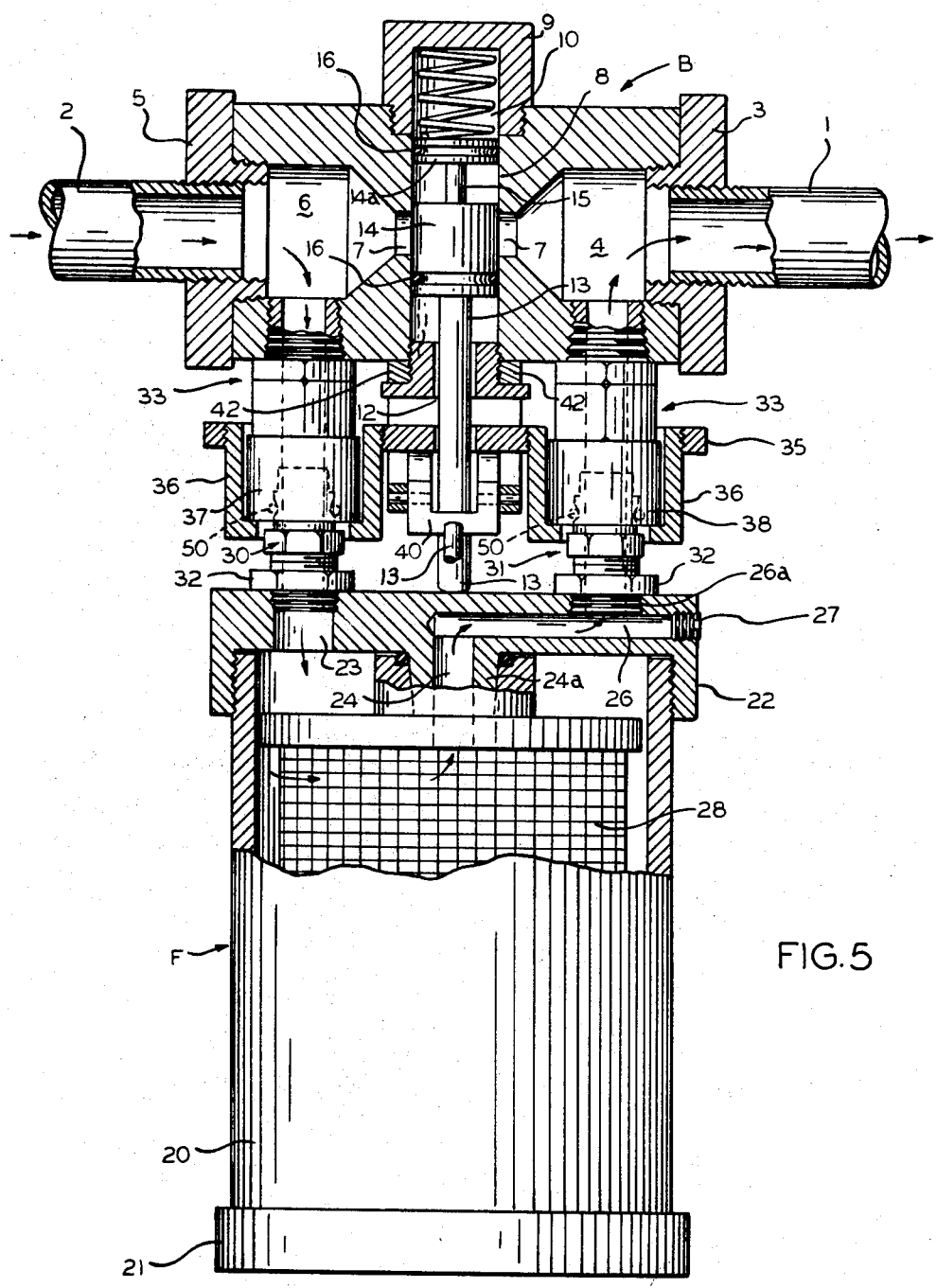
FIG. 5 is an enlarged longitudinal sectional view of the fragmentary portion of the system and filter unit connected therewith.

The valved coupler and nipple operate as follows: When the valve body and filter body are connected as illustrated in FIGS. 2 and 5 the valves in the couplers 30 and 31 are open to permit fluid to pass from the chamber 6 in the valve body B through the filter 28 and into the chamber 4 in the valve body B as indicated by the arrows in FIG. 5. When the valve body B and filter casing 20 are coupled as indicated, the cap 22 contacts the rod 13 and holds the slide valve 14 in the position shown in FIG. 5 closing passage 7 between the chambers 4 and 6, thus the flow of fluid is bypassed through the filter unit F.

Figure 3:
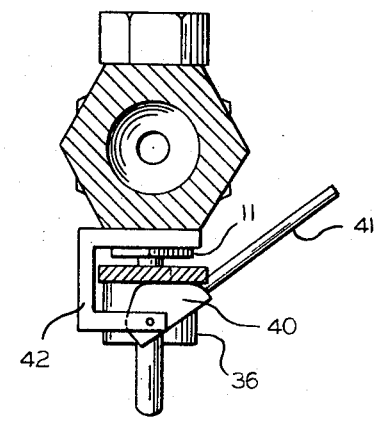
FIG. 3 is a transverse sectional view of the fragmentary portion of the system shown in FIG. 1, taken on the line 3—3 of FIG. 1.

Mechanism for releasing the filter unit F, comprises a plate 35 which is movable vertically and carries a pair of sleeves 36, each embracing respective slidable sleeves 37 and 38 slidable on the valve couplings 33. A cam 40 having a lever 41 is carried beneath the plate 33 by means of a U-bracket 42 (FIGS. 3 and 4) secured to the valve body B by means of the bushing 11. When the valve body B and filter unit F are connected, the cam 40 and lever 41 are positioned as shown in FIG. 3 and the sleeves 36 hold the balls 50 in locked relationship to the valved nipples 32, thus holding the filter unit F suspended from the valve body B.

Figure 4:
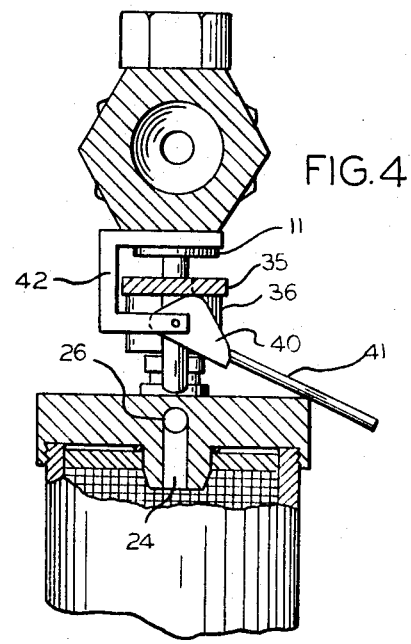
FIG. 4 is a transverse sectional view taken on the line 4—4 of FIG. 2.

When it is desired to remove the filter unit F from the valve body B, the cam 40 will be moved to the position shown in FIG. 4 by means of the handle 41, thus elevating the plate 35 and through the sleeves 36 cause the slidable sleeves 37–38 to move upwardly to release the balls 50 and permit the filter unit to move downwardly whereupon the valves in the coupler 30–31 close and the slidable valve 14 in the body B opens the venturi-like passage 7 by positioning the space 8, between the valve 14 and the valve portion 14A, in registry with the passage 7.

The modified form illustrated in FIGS. 6, 7 and 8 comprises a valve body B' having a chamber 4' threaded to recieve a pipe coupling similar to 3 in FIG. 5 and having a chamber 6' threaded to receive a pipe coupling similar to 5 in FIG. 5.

The chambers 4' and 6' are connected by a venturi-like opening 7' intersected by a transverse bore 8' closed at its upper end 9'. The opposite or lower end of the bore 8' is closed by a bushing 11' having a bearing bore rotatably receiving the rod 13'. The rod 13' is integral with the valve 14' which is provided with a transverse bore 15' having its axis substantially co-incident with the axis common to the opening 7' as shown in FIG. 6. As will appear more specifically hereafter, when the valve 14' is rotated 90° from the position shown in FIG. 6 the passage from chamber 4' to 6' through the venturi-like openings 7' is closed and fluid in the fluid system is by-passed through the filter unit F.

In the modified form illustrated in FIGS. 6, 7 and 8, the mechanism for releasing the filter unit F, comprises a plate 35 which is movable vertically and carries a pair of sleeves 36, each respectively embracing slideable sleeves 37 and 38 on the valve couplings 33, as shown in FIG. 5. A camming element 55 loosely surrounds the lower end of the valve rod 13' and is secured to the plate 35 by means of the threaded collar 56. As indicated the element 55 is provided with a threaded periphery 57 which is complementary to inner threaded portion of nut 58. The nut 58 is secured to the lower end of the valve rod 13' in any suitable manner as by a key 59. A screw 60 may be provided for insuring engagement between the complementary threads on the element 55 and nut 58. An operating handle 61 is secured to and projects radially of the nut 58.

In the position of the handle 61, as shown in FIGS. 6 and 7, the transverse bore 15' in the valve 14' is disposed at right angles with reference to the openings 7' and prevents the flow of fluid directly through the valve body B' from chamber 4' to chamber 6', or vice-versa, depending upon the direction of flow of the fluid through the system. At the same time the valves in the valve couplings 33 are opened and flow through the filter is permitted, the filter body F being locked in position as described with reference to the form shown in FIGS. 1 through 5.

When the handle 61 is moved to the position shown in FIG. 8, the valve 14' is rotated 90° to dispose the transverse bore 15' in registry with the openings, thus allowing flow of fluid directly from chamber 4' to 7', or vice-versa. While the handle 61 is being rotated from the positions shown in FIGS. 6 and 7 to the position shown in FIG. 8, the nut 58 will also be caused to rotate and complementary threaded surfaces between the nut 58 and element 55 causes the element 55 to move upwardly with reference to FIG. 6 and carry the plate 35 with it. As the plate 35 is moved upwardly, the filter body F in the manner previously described and the valves in the valve couplings closed, thereby preventing loss of fluid while the filter body F is removed from the fluid circuit.

When the filter body is returned to the fluid system, the couplings 33 will be joined as shown in FIGS. 6 and 7 and the handle 61 will be rotated to the left relative to FIGS. 6, 7 and 8, thus lowering the plate 35 through the element 55 and nut 58 and thereby sliding the sleeves 36 over the coupling 33 and locking the filter body F to the valve body B. At the same time the valve 14' will be rotated to close the passage between the chambers 4' and 6' in the valve body.

As will be obvious from the foregoing disclosure and the drawings a novel combination of a valve body in a fluid system and a detachable filter body has been provided whereby the flow of the fluid in the system may be by-passed through the filter body when the valve body and filter body are connected and automatically directed through the valve body only when the filter body is disconnected from the valve body and a minimum loss of fluid occurs during the operations of connecting and disconnecting the filter body and valve body.

In this manner the flow of fluid in the system need not be interrupted while the filter element is being replaced, particularly in fluid systems designed to transmit power.

I claim as my invention:

1. In a fluid transmission system including a valve body having a passage therethrough for the transmission of fluid and a valve rotatable in said body and having a transverse bore registering with said passage in one position and disposed transversely of said passage in another position, an outlet port at one side of said valve leading from said passage and an inlet port at the opposite side of said valve opening into said passage, and a filter body detachably secured to said valve body, the combination with a pair of relatively spaced fluid transmitting couplings each comprising a portion connected to one of said ports in said valve body and a portion connected to said filter body, of releasable interlocking means between the corresponding portions of each coupling, manually operable means for releasing said interlocking means, valving means in each of said couplings normally open for the passage of fluid through said filter body when said locking means is operative, said valve in said body and valve stem having interacting means and said valve body operable on rotation of said valve in said body to cause separation of said couplings, said valve in said valve body having a stem, whereby when said filter body is removed from said valve body said valving means in said couplings are closed and said valve in said valve body is opened, said manually operable means including rotatable camming means interacting with said stem for the release of said coupling.

References Cited

FOREIGN PATENTS 949,892   3/1949   France.

SAMIH N. ZAHARNA, *Primary Examiner.*